US012044036B2

(12) United States Patent
Holst-Larsen et al.

(10) Patent No.: US 12,044,036 B2
(45) Date of Patent: Jul. 23, 2024

(54) HUB FOR LOCK DEVICE, AND LOCK DEVICE

(71) Applicant: ASSA ABLOY AB, Stockholm (SE)

(72) Inventors: Erik Holst-Larsen, Oslo (NO); Erlend Omvik, Skotbu (NO); Bjørn Kolstad, Råde (NO)

(73) Assignee: ASSA ABLOY AB, Stockholm (SE)

( * ) Notice: Subject to any disclaimer, the term of this patent is extended or adjusted under 35 U.S.C. 154(b) by 421 days.

(21) Appl. No.: 17/296,502

(22) PCT Filed: Nov. 4, 2019

(86) PCT No.: PCT/EP2019/080066
§ 371 (c)(1),
(2) Date: May 24, 2021

(87) PCT Pub. No.: WO2020/126183
PCT Pub. Date: Jun. 25, 2020

(65) Prior Publication Data

US 2022/0034122 A1 Feb. 3, 2022

(30) Foreign Application Priority Data

Dec. 17, 2018 (EP) .................................. 18213048.4

(51) Int. Cl.
*E05B 13/00* (2006.01)
*E05B 63/16* (2006.01)
(Continued)

(52) U.S. Cl.
CPC ............ *E05B 13/005* (2013.01); *E05B 63/16* (2013.01); *E05B 63/0017* (2013.01)

(58) Field of Classification Search
CPC .... E05B 3/00; E05B 15/0013; E05B 15/1635; E05B 13/005; E05B 63/16; E05C 19/06;
(Continued)

(56) References Cited

U.S. PATENT DOCUMENTS 1,888,238 A * 11/1932 Moore ...................... E05C 1/16 292/336.5
4,566,350 A * 1/1986 Miyamoto .............. E05B 79/12 74/519
(Continued)

FOREIGN PATENT DOCUMENTS

CN 1875164 12/2006
CN 101014750 8/2007
(Continued)

OTHER PUBLICATIONS

Official Action with English Translation for China Patent Application No. 201980082764.0, dated Nov. 22, 2021, 12 pages.
(Continued)

*Primary Examiner* — Carlos Lugo
(74) *Attorney, Agent, or Firm* — Schwegman Lundberg & Woessner, P.A.

(57) ABSTRACT

A hub (10) for a lock device (104), the hub (10) comprising an outer member (12) having an outer opening structure (20); an inner member (14) having an inner opening structure (22); an intermediate member (16) having an intermediate opening structure (24); an attachment element (18) configured to be attached to the intermediate member (16), and being movable between a locking position (96) and an unlocking position (102); and a locking member (28) for rotationally locking the outer member (12) and the intermediate member (16), or for rotationally locking the inner member (14) and the intermediate member (16); wherein the hub (10) is configured such that the locking member (28) can be withdrawn from the intermediate member (16) when the attachment element (18) adopts the unlocking position (102). A lock device (104) comprising a hub (10) is also provided.

15 Claims, 10 Drawing Sheets

(51) Int. Cl.
*E05B 63/00* (2006.01)
*E05B 63/04* (2006.01)

(58) Field of Classification Search
CPC ................. E05C 19/063; E05C 19/066; Y10T 292/0894; Y10T 292/0902; Y10T 292/0907; Y10S 292/38
See application file for complete search history.

(56) References Cited

U.S. PATENT DOCUMENTS

| | | | | | |
|---|---|---|---|---|---|
| 5,617,749 | A * | 4/1997 | Park | E05B 3/065 292/336.3 |
| 6,578,446 | B2 * | 6/2003 | Staser | E05B 77/34 74/519 |
| 10,316,544 | B2 * | 6/2019 | Mitchell | E05B 15/02 |
| 10,352,069 | B2 * | 7/2019 | Yamane | E05B 79/08 |
| 11,566,441 | B2 * | 1/2023 | Raatikainen | E05B 63/16 |
| 2017/0101805 | A1 | 4/2017 | Mitchell | |

FOREIGN PATENT DOCUMENTS

| | | | | | |
|---|---|---|---|---|---|
| CN | 103348072 | | 10/2013 | |
| DE | 2023300 | A1 * | 11/1971 | |
| DE | 2526218 | A1 * | 12/1976 | |
| DE | 19727364 | C1 * | 10/1998 | E05B 13/005 |
| DE | 102012024820 | A1 * | 6/2014 | E05B 15/0013 |
| EP | 0350724 | A2 * | 1/1990 | |
| EP | 0488191 | A1 * | 6/1992 | |
| EP | 0620341 | | 10/1994 | |
| EP | 3299546 | | 3/2018 | |
| FR | 2783858 | A1 * | 3/2000 | E05C 9/004 |
| KR | 100783421 | B1 * | 12/2007 | |

OTHER PUBLICATIONS

Extended Search Report for European Patent Application No. 18213048.4, dated Jun. 17, 2019, 5 pages.

International Search Report and Written Opinion for International (PCT) Patent Application No. PCT/EP2019/080066, dated Feb. 5, 2020, 11 pages.

* cited by examiner

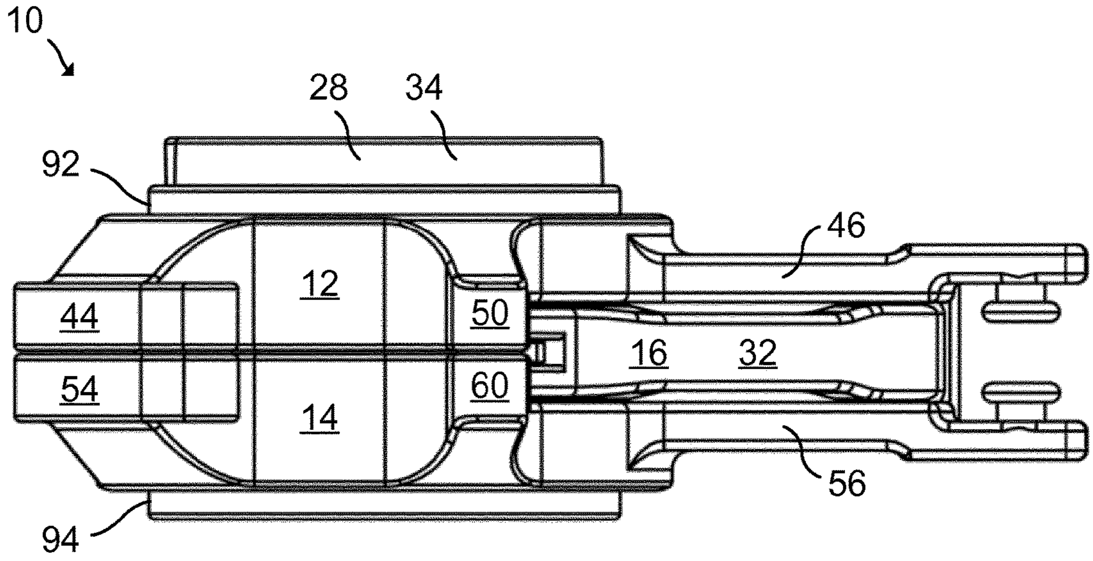
Fig. 5
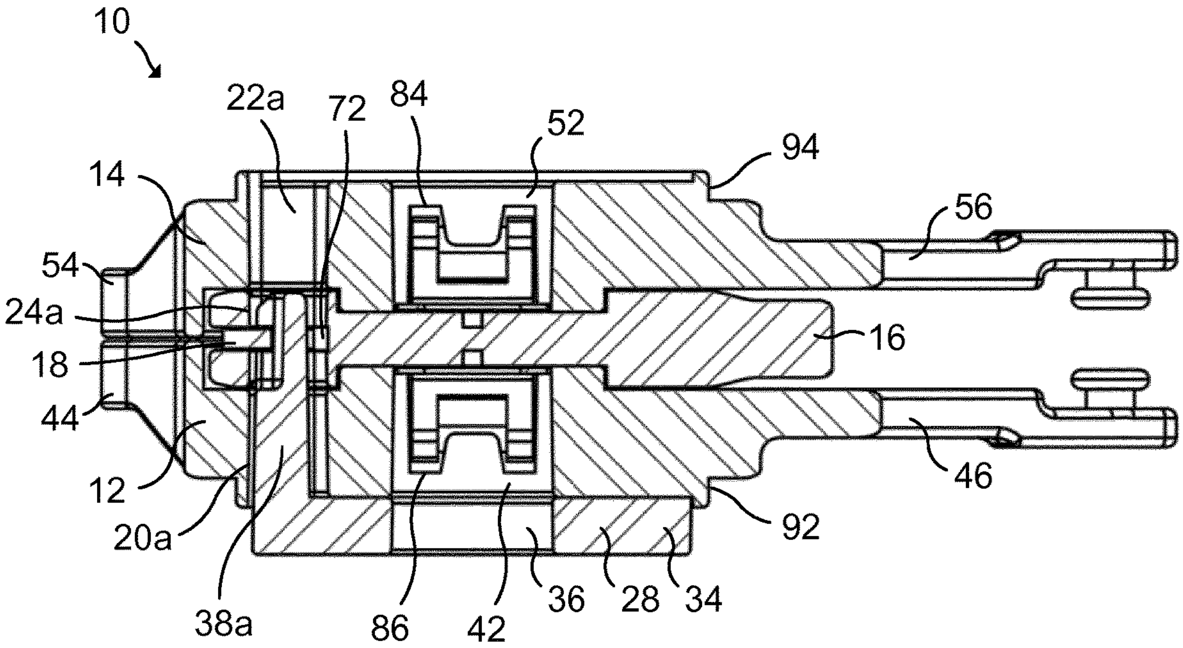
Fig. 6 B-B

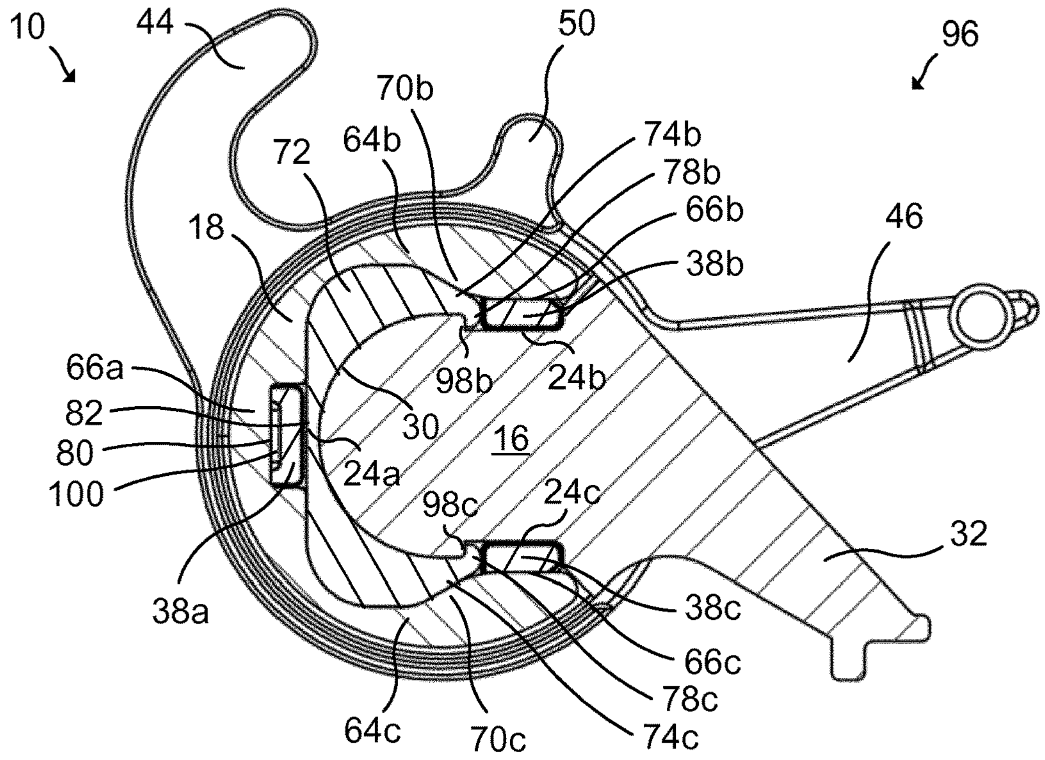
Fig. 7 C-C
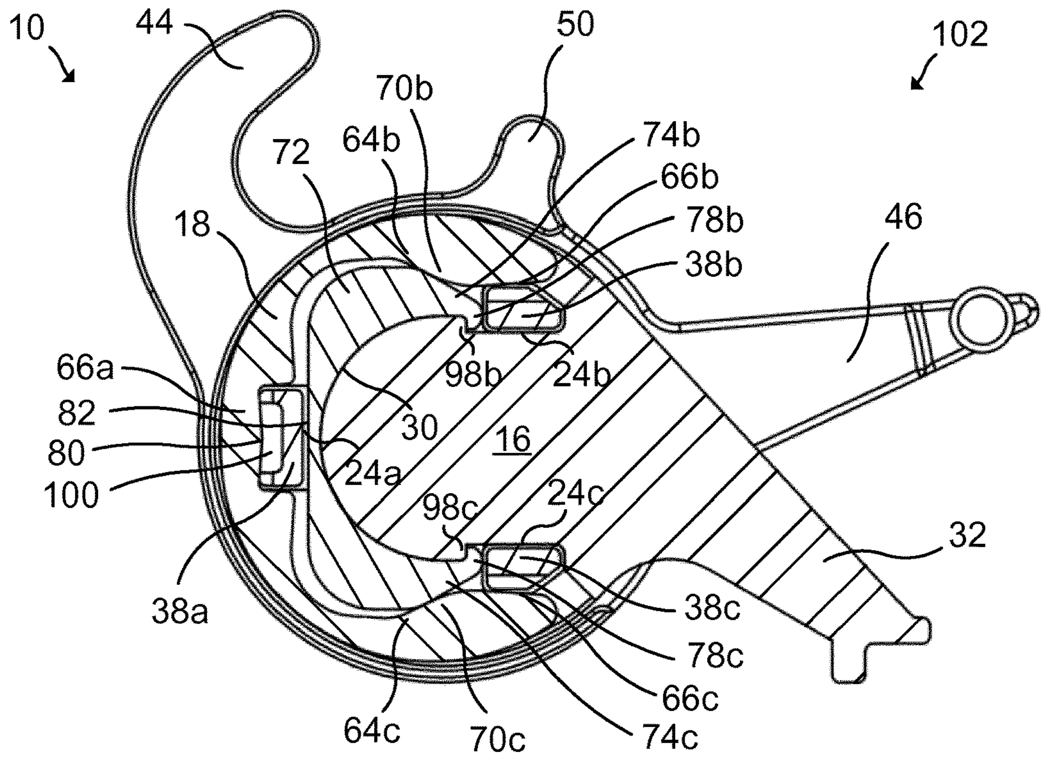
Fig. 8

HUB FOR LOCK DEVICE, AND LOCK DEVICE

CROSS REFERENCE TO RELATED APPLICATIONS

This application is a national stage application under 35 U.S.C. 371 and claims the benefit of PCT Application No. PCT/EP2019/080066 having an international filing date of Nov. 4, 2019, which designated the United States, which PCI application claimed the benefit of Europe Patent Application No. 18213048.4 filed Dec. 17, 2018, the disclosure of each of which are incorporated herein by reference.

TECHNICAL FIELD

The present disclosure generally relates to a hub for a lock device. In particular, a hub for a lock device, the hub comprising a locking member for locking an intermediate member with either an outer member or an inner member, and a lock device comprising a hub, are provided.

BACKGROUND

In some known lock devices, a handle function can be selectively engaged with a boll on one side of the door to which the lock device is fitted. The handle function on the opposite side of the door may also be selectively engaged with the boll, or may be permanently engaged with the bolt, i.e. to provide an unlocked side. Engagement and disengagement of the handle function is typically effected electromechanically, for example by means of a solenoid arrangement or the like in the lock device. The solenoid arrangement may be controlled by a keypad, card reader or similar, or by remote control. Such electrically operated lock devices can for example be fitted to interior doors, such as hotel room doors. A so-called electric lever handle lock is an example of such lock device, with which it is possible to engage and disengage a lever handle function on one or both sides of a door.

Lock devices of the above type are associated with several drawbacks. Due to the electromechanical control of engagement and disengagement of at least one of the handles, the lock devices require many and space-demanding components. Many times, a hub of such lock devices comprises several loose components which makes the installation of the hub in a lock device complicated and time consuming. With prior art lock devices of the above type, it is also complicated to reconfigure the lock device, i.e. to switch a selectively engaged side with a permanently unlocked side of the lock device.

EP 0620341 A1 discloses a device for adapting a panic-safe lock to the opening direction of a door, for presetting the lock to open only from one side and for temporarily allowing to open it from the opposite side. The device comprises a pair of annular elements rotatably supportable in the lock and having coaxial polygonal seats for the side-fitting engagement of a respective handle, and threaded coaxial holes parallel to the axis of the seats, the annular elements being able to rotate in contrast with elastic means from a fixed abutment position, a lever which is pivoted between the annular elements coaxially thereto and has a slot alignable with the threaded holes and in which a screw is inserted, the screw being screwed into one of the threaded holes and having such a length as to rotationally couple the lever and the annular element in which the screw has been screwed, the other annular element being free, the lever having a first arm for the actuation of the spring latch, a second arm for the simultaneous actuation of the bolt, and a pawl actuatable by means of the tumbler of a key-operated device and suitable to engage teeth of the annular elements to provide a rotational coupling between the lever and the annular elements.

SUMMARY

One object of the present disclosure is to provide a hub for a lock device, which hub is simple to install.

A further object of the present disclosure is to provide a hub for a lock device, which hub is simple to configure and reconfigure.

A still further object of the present disclosure is to provide a hub for a lock device, which hub has a simple, wear resistant, compact and/or cheap design.

A still further object of the present disclosure is to provide a hub for a lock device, which hub can be fitted inside different types of lock devices.

A still further object of the present disclosure is to provide a hub for a lock device, which hub solves several or all of the foregoing objects in combination.

A still further object of the present disclosure is to provide a lock device comprising a hub, which lock device solves several or all of the foregoing objects.

According to one aspect, there is provided a hub for a lock device, the hub comprising an outer member for rotation about a hub axis, the outer member comprising an outer opening structure; an inner member for rotation about the hub axis, the inner member comprising an inner opening structure; an intermediate member for rotation about the hub axis, the intermediate member comprising an intermediate opening structure, and being configured to be arranged between the outer member and the inner member; an attachment element configured to be attached to the intermediate member, the attachment element being movable between a locking position and an unlocking position; and a locking member configured to be inserted into the outer opening structure and the intermediate opening structure from an exterior outer side of the hub to engage the attachment element in the locking position, and rotationally lock the outer member and the intermediate member for common rotation about the hub axis, or into the inner opening structure and the intermediate opening structure from an exterior inner side of the hub to engage the attachment element in the locking position, and rotationally lock the inner member and the intermediate member for common rotation about the hub axis; wherein the hub is configured such that an engagement between the locking member and the attachment element is released by moving the attachment element from the locking position to the unlocking position.

When the attachment element adopts the locking position and the locking member engages the attachment element, the engagement prevents the locking member from being withdrawn from the hub. However, when the attachment element adopts the unlocking position, the locking member can be withdrawn from the intermediate member. The hub may be configured such that the locking member can be manually withdrawn, e.g. pulled straight out from the hub by hand, when the attachment element adopts the unlocking position.

The hub may be configured such that the attachment element can be manipulated, from the locking position to the unlocking position, from an exterior side of the hub opposite to the locking member. This manipulation of the attachment may thus be made from an unlocked side of the lock device, e.g. from an inner side if the locking member is inserted to the hub from the outer side and vice versa. Such manipulation may for example be carried out by a flat-blade screwdriver, or similar means.

Each of the outer member, the inner member and the intermediate member may have a generally flat shape, e.g. having extension planes perpendicular to the hub axis. When the hub is installed in a lock device, the intermediate member may then be sandwiched between the outer member and the inner member. The outer member and the inner member may have mirrored shapes, e.g. being mirrored with respect to an extension plane of the intermediate member, perpendicular to the hub axis.

The outer opening structure and the inner opening structure may comprise a plurality of, such as three, outer through holes and inner through holes, respectively. The intermediate member may comprise a corresponding number of, such as three, intermediate through holes. Alternatively, the intermediate member may comprise a corresponding number of, such as three, intermediate blind holes on each side. The outer through holes, the inner through holes and the intermediate holes may be aligned when the hub is installed in a lock device and when each of the outer member and the inner member adopts a neutral position.

The locking position and the unlocking position of the attachment element may alternatively be referred to as a locking state and an unlocking state, respectively. The locking member may be a plug.

The outer member may comprise an outer lever arm for being forced by an outer elastic element of the lock device in order to rotate the outer member about the hub axis to a neutral position, and the inner member may comprise an inner lever arm for being forced by an inner elastic element of the lock device in order to rotate the inner member about the hub axis to a neutral position. The outer elastic element and the inner elastic element may for example be constituted by springs arranged to rotationally force each of the outer member and the inner member to rotate about the hub axis to a neutral position. The springs may be either compression springs or tension springs. That is, the outer elastic element and the outer lever arm may be used for returning an outer handle and the inner elastic element and the inner lever arm may be used for returning an inner handle.

The outer member may comprise an outer bolt actuating part for actuating a boll in the lock device by rotation of the outer member about the hub axis, and the inner member may comprise an inner boll actuating part for actuating the boll in the lock device by rotation of the inner member about the hub axis.

The outer member may comprise an outer pin opening for receiving an outer handle pin of an outer door handle. The inner member may comprise an inner pin opening for receiving an inner handle pin of an inner door handle.

The attachment element may be configured to be resiliently deformed between the locking position and the unlocking position. The attachment element may be more deformed in the unlocking position, and less deformed, or not deformed at all, in the locking position. Thereby, the attachment element can automatically return to the locking position, e.g. when withdrawing a screwdriver. The attachment element may be directly or indirectly attached to the intermediate member.

The attachment element may be a C-clip. The C-clip may be expanded when adopting the unlocking position and contracted when adopting the locking position.

The locking member may be configured to be attached to the attachment element by means of a snap-fit. The snap-fit may be a cantilever snap fit.

The locking member may comprise at least one locking arm configured to engage the attachment element. Each locking arm may comprise a locking hook for engaging the attachment element, e.g. by means of a snap-fit. The locking member may for example comprise three locking arms.

The locking member may further comprise a base from which the at least one locking arm extends. The base may have a flat shape configured to mate with an exterior surface of the outer member or the inner member.

The hub may further comprise a cam profile. In this case, the attachment element may comprise a cam follower configured to follow the cam profile in order to move between the locking position and the unlocking position.

The hub may further comprise a cam element and the cam profile may be provided on the cam element. In this case, the attachment element may be indirectly attached to the intermediate member, i.e. via the cam element. As an alternative, the cam profile may be formed on the intermediate member.

The cam element may be configured to be attached to the intermediate member by means of a snap-fit. This snap-fit may be a permanent snap-fit.

The cam element may be a C-clip. When both the attachment element and the cam element are C-clips, the cam element may be configured to be arranged within the attachment element. The cam element may be arranged within the attachment element in a common extension plane, such as a plane perpendicular to the hub axis.

In case both the attachment element and the cam element are C-clips, the smaller C-clip constituting the cam element may be inserted sideways into the larger C-clip constituting the attachment element, such that the C-clips are in a single plane. In this regard, sideways is meant a direction normal to the extension planes of the C-clips.

In addition, the cam element may be configured to be expanded within the attachment element. Thereby, the cam element can be installed to the intermediate member by means of the cam element with little or no deformation of the attachment element.

An opening may be provided between an outer back surface of the cam element and an inner back surface of the attachment element when the cam element is arranged within the attachment element. This opening may be aligned with the intermediate opening structure, and the outer opening structure and/or the inner opening structure.

In this case, a flat-blade screwdriver can be used to move the attachment element from the locking position to the unlocking position. A shaft of the screwdriver can be inserted through outer opening structure or the inner opening structure, i.e. from an unlocked side that is not occupied by the locking member. When twisting the screwdriver blade, the opening expands such that the attachment element is released, e.g. moves away from the cam element and slightly expands into the unlocking position. The locking member can then be gripped and pulled out from the hub. If the attachment element is made resilient, the attachment element flexes back into the locking position after withdrawal of the screwdriver. The opening may alternatively be provided between an exterior back surface of the intermediate member, or other component of the hub, and the interior back surface of the attachment element, in case the hub does not comprise the cam element.

The intermediate member may comprise a recess for receiving the attachment element. The recess may be arranged in a plane substantially perpendicular to, or perpendicular to, the hub axis, e.g. in an extension plane of the intermediate member. The recess may be a circumferential recess. Both the attachment element and the cam element may be received in the recess.

The recess may be joined with the intermediate opening structure, i.e. open into the intermediate opening structure. Thereby, the locking member inserted into the intermediate opening structure can engage the attachment element received in the recess.

The intermediate member may comprise an intermediate Mocking arm for being selectively blocked by a Mocking mechanism of the lock device in order to block rotation of the intermediate member. The blocking mechanism may be electromechanical. Thereby, the one of the outer member and the inner member that is rotationally locked with the intermediate member by means of the locking member, is also selectively blocked by the blocking mechanism. By unblocking the intermediate blocking arm by moving the blocking mechanism, rotation of the intermediate member, and of the one of the outer member and the inner member that is rotationally locked with the intermediate member by means of the locking member, is accepted and the lock device can be opened.

According to a further aspect, there is provided a lock device comprising a hub according to the present disclosure. Throughout the present disclosure, the lock device may be an electromechanical lock device.

Throughout the present disclosure, the prefixes “outer” and “inner” are used to distinguish components of, and interacting with, the outer member and the inner member, respectively. The outer member and the inner member, components thereof, and components interacting therewith, may alternatively be referred to with the prefixes “first” and “second”, respectively.

BRIEF DESCRIPTION OF THE DRAWINGS

Further details, advantages and aspects of the present disclosure will become apparent from the following embodiments taken in conjunction with the drawings, wherein:

FIG. 5: schematically represents a top view of the hub;

FIG. 6: schematically represents a cross-sectional view of section B-B of the hub in FIG. 2;

FIG. 7: schematically represents a cross-sectional view of section C-C of the hub in FIG. 2;

FIG. 8: shows the hub in FIG. 7 when an attachment element has moved;

DETAILED DESCRIPTION

Figure 1:
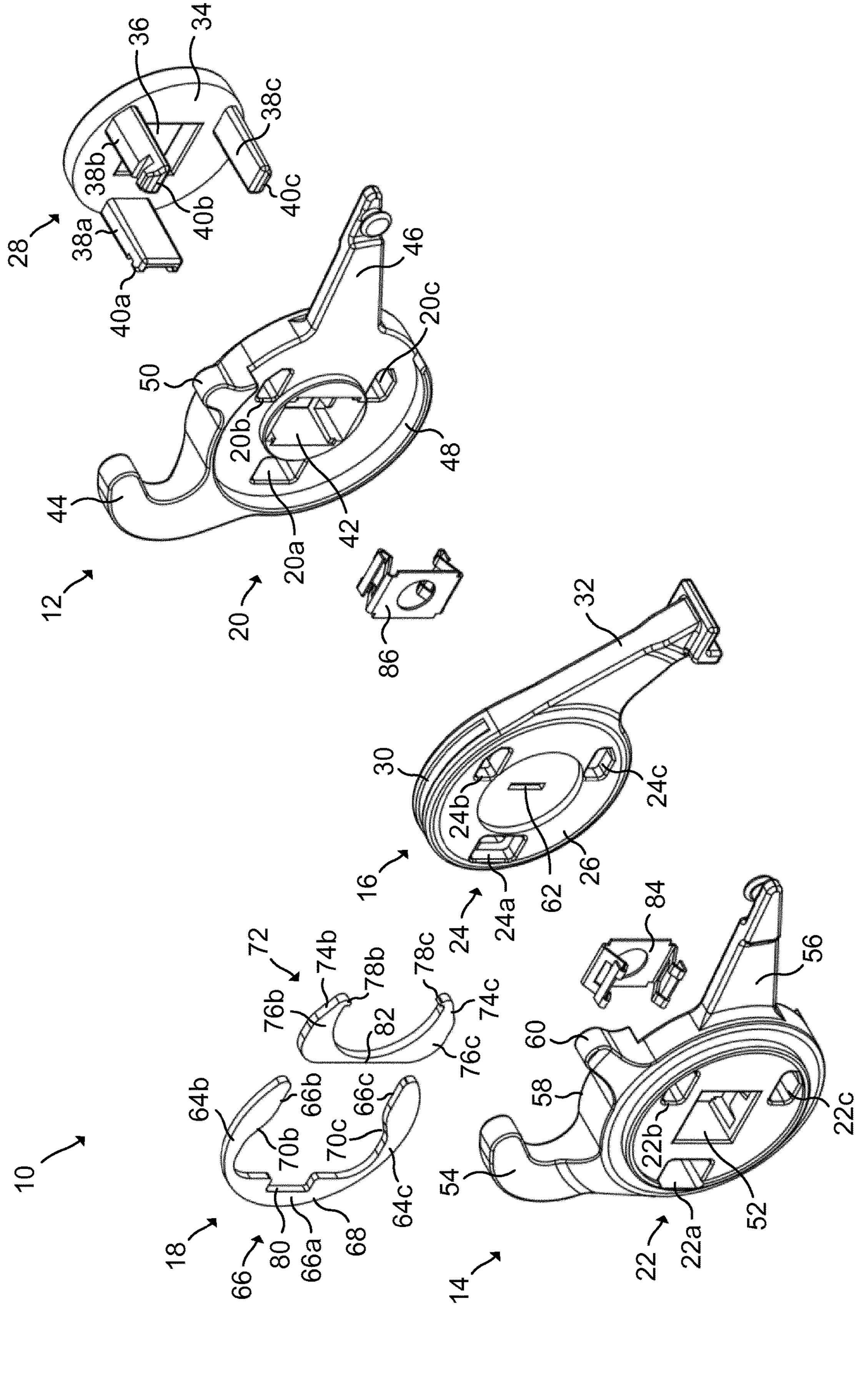
FIG. 1: schematically represents an exploded perspective view of a hub.

In the following, a hub for a lock device, the hub comprising a locking member for locking an intermediate member with either an outer member or an inner member, and a lock device comprising a hub, will be described. The same reference numerals will be used to denote the same or similar structural features.

FIG. 1 schematically represents an exploded perspective view of a hub 10 for a lock device. The hub 10 comprises an outer member 12, an inner member 14, and an intermediate member 16. Each of the outer member 12, the inner member 14 and the intermediate member 16 is configured to rotate about a hub axis of the lock device.

The hub 10 further comprises an attachment element 18. The attachment element 18 is configured to be attached to the intermediate member 16. The attachment element 18 is movable between a locking position and an unlocking position. The attachment element 18 may remain attached to the intermediate member 16 in both the locking position and in the unlocking position.

The outer member 12 comprises an outer opening structure 20. In this example, the outer opening structure 20 comprises three outer through holes 20*a*, 20*b*, 20*c*. The inner member 14 comprises an inner opening structure 22. In this example, the inner opening structure 22 comprises three inner through holes 22*a*, 22*b*, 22*c*. The intermediate member 16 comprises an intermediate opening structure 24. The intermediate member 16 is configured to be arranged between the outer member 12 and the inner member 14. In this example, the intermediate opening structure 24 comprises three intermediate holes 24*a*, 24*b*, 24*c*. The intermediate holes 24*a*, 24*b*, 24*c* are here constituted by through holes provided in an intermediate body 26 of the intermediate member 16.

As shown in FIG. 1, each of the outer member 12, the inner member 14 and the intermediate member 16 has a generally flat shape. Each of the outer member 12, the inner member 14 and the intermediate member 16 may for example be made of metal.

The hub 10 further comprises a locking member 28. The locking member 28 is configured to be inserted from an exterior outer side of the hub 10 into the outer opening structure 20 of the outer member 12 and into the intermediate opening structure 24 of the intermediate member 16, i.e. from the right in FIG. 1. When the locking member 28 is inserted into the outer opening structure 20 and the intermediate opening structure 24, the locking member 28 blocks relative rotation between the outer member 12 and the intermediate member 16. Thereby, the outer member 12 and the intermediate member 16 are rotationally locked by the locking member 28 for common rotation about the hub axis.

The locking member 28 is also configured to be inserted from an exterior inner side of the hub 10 into the inner opening structure 22 of the inner member 14 and into the intermediate opening structure 24 of the intermediate member 16, i.e. from the left in FIG. 1. When the locking member 28 is inserted into the inner opening structure 22 and the intermediate opening structure 24, the locking member 28 blocks relative rotation between the inner member 14 and the intermediate member 16. Thereby, the inner member 14 and the intermediate member 16 are rotationally locked by the locking member 28 for common rotation about the hub axis.

As shown in FIG. 1, the locking member 28 constitutes a plug. The locking member 28 may for example be made of metal, such as stainless steel.

The intermediate member 16 further comprises a recess 30. The recess 30 is configured to receive the attachment element 18. As shown in FIG. 1, the recess 30 extends circumferentially along the intermediate body 26. The recess 30 is arranged in a plane perpendicular to the hub axis.

The intermediate member 16 further comprises an intermediate Mocking arm 32. The intermediate Mocking arm 32 extends from the intermediate body 26. The intermediate Mocking arm 32 is configured to be selectively blocked by a Mocking mechanism of the lock device. Thereby, rotation of the intermediate member 16, and either the outer member 12 or the inner member 14 locked thereto by means of the locking member 28, can be selectively blocked.

The locking member 28 in FIG. 1 comprises a base 34. The base 34 of this example is flat and can thereby be mated with an exterior outer surface or an exterior inner surface of the outer member 12 and the inner member 14, respectively. A locking member opening 36 is provided in the base 34. The locking member opening 36 is configured to receive either an outer handle pin of an outer door handle, or an inner handle pin of an inner door handle, therethrough.

The locking member 28 in FIG. 1 further comprises three locking arms 38*a*, 38*b*, 38*c*. The locking arms 38*a*, 38*b*, 38*c* extend perpendicular to an extension plane of the base 34. Each locking arm 38*a*, 38*b*, 38*c* is configured to be inserted either through a corresponding outer through hole 20*a*, 20*b*, 20*c* of the outer member 12, or through a corresponding inner through hole 22*a*, 22*b*, 22*c* of the inner member 14, and into a corresponding intermediate hole 24*a*, 24*b*, 24*c* of the intermediate member 16.

Each locking arm 38*a*, 38*b*, 38*c* is configured to engage the attachment element 18 when the attachment element 18 is in the locking position in the intermediate member 16. To this end, each locking arm 38*a*, 38*b*, 38*c* comprises a locking hook 40*a*, 40*b*, 40*c* for engaging the attachment element 18 by means of a snap-fit. The engagement between the locking arms 38*a*, 38*b*, 38*c* and the attachment element 18 can be released by moving the attachment element 18 from the locking position to the unlocking position.

The outer member 12 further comprises an outer pin opening 42. The outer pin opening 42 is configured to receive an outer handle pin of an outer door handle. The outer member 12 can thereby rotate together with an outer door handle. The outer pin opening 42 is here square-shaped, but may have alternative, such as polygonal, shapes.

The outer member 12 further comprises an outer bolt actuating part 44. The outer bolt actuating part 44 is configured to actuate a bolt in the lock device by rotation of the outer member 12 about the hub axis.

The outer member 12 further comprises an outer lever arm 46. The outer lever arm 46 is configured to be attached to an outer elastic element of the lock device in order to rotate the outer member 12 about the hub axis to a neutral position.

The outer member 12 further comprises an outer collar 48. The outer collar 48 protrudes towards the intermediate member 16 and is configured to partly receive the intermediate body 26 of the intermediate member 16. Thereby, the intermediate member 16 can be held by the outer member 12. The outer member 12 further comprises an outer stop 50, here exemplified as a protrusion, for stopping the outer member 12 in the neutral position.

As shown in FIG. 1, the inner member 14 is mirrored with respect to the outer member 12. The inner member 14 further comprises an inner pin opening 52. The inner pin opening 52 is configured to receive an inner handle pin of an inner door handle. The inner member 14 can thereby rotate together with an inner door handle. Also the inner pin opening 52 of this example is square-shaped.

The inner member 14 further comprises an inner bolt actuating part 54. The inner boll actuating part 54 is configured to actuate the boll in the lock device by rotation of the inner member 14 about the hub axis.

The inner member 14 further comprises an inner lever arm 56. The inner lever arm 56 is configured to be attached to an inner elastic element of the lock device in order to rotate the inner member 14 about the hub axis to a neutral position.

The inner member 14 further comprises an inner collar 58. The inner collar 58 protrudes towards the intermediate member 16 and is configured to partly receive the intermediate body 26 of the intermediate member 16. Thereby, the intermediate member 16 can be held by the inner member 14. The inner member 14 further comprises an inner stop 60, here exemplified as a protrusion, for stopping the inner member 14 in the neutral position.

The intermediate member 16 further comprises a slit 62. The slit 62 may be used for rotationally aligning the intermediate member 16 with the outer member 12, when received in the outer collar 48, or for rotationally aligning the intermediate member 16 with the inner member 14, when received in the inner collar 58. The slit 62 may for example be engaged by a flat-blade screwdriver. When the intermediate member 16 is aligned with the outer member 12, the locking member 28 can be inserted into the outer opening structure 20 and into the intermediate opening structure 24. When the intermediate member 16 is aligned with the inner member 14, the locking member 28 can be inserted into the inner opening structure 22 and into the intermediate opening structure 24.

The attachment element 18 is configured to be resiliently deformed between the locking position and the unlocking position. The attachment element 18 comprises two attachment arms 64*b*, 64*c*. The attachment element 18 further comprises an attachment structure 66 for being engaged by the locking member 28. In FIG. 1, the attachment structure 66 comprises three attachment profiles 66*a*, 66*b*, 66*c* for being engaged by a respective locking hook 40*a*, 40*b*, 40*c* of the locking member 28. The attachment profile 66*a* is arranged on an inside of a rear section 68 of the attachment element 18. The attachment profiles 66*b*, 66*c* are arranged on an inside of a respective attachment arm 64*b*, 64*c*.

The attachment element 18 of this example is a resilient C-clip, for example made of metal, such as stainless steel. The attachment element 18 constituted by a C-clip expands when adopting the unlocking position and contracts when adopting the locking position.

The attachment element 18 further comprises two cam followers 70*b*, 70*c*. The cam followers 70*b*, 70*c* are each constituted by a sloping surface on an inside of a respective attachment arm 64*b*, 64*c*.

The hub 10 of the example in FIG. 1 further comprises a cam element 72. The cam element 72 comprises two cam profiles 74*b*, 74*c*. The cam profiles 74*b*, 74*c* are configured to be engaged by the cam followers 70*b*, 70*c*. The cam element 72 comprises two cam arms 76*b*, 76*c*. The cam profiles 74*b*, 74*c* are each constituted by a sloping surface on each cam arm 76*b*, 76*c*.

Thus, in this example, the cam profiles 74*b*, 74*c* are provided on the cam element 72. However, the cam profiles 74*b*, 74*c* may be provided in alternative ways, for example provided directly on the intermediate member 16. In this case, the cam element 72 can be omitted.

Also the cam element 72 of this example is a resilient C-clip, for example made of plastic. The cam element 72 is configured to be attached to the intermediate member 16 by means of a snap-fit in the recess 30. This snap-fit may be permanent.

The cam element 72 can be inserted laterally into the attachment element 18, i.e. such that the cam element 72 is arranged within the attachment element 18 in a common extension plane, before attaching the cam element 72 to the intermediate member 16. When the attachment element 18 and the cam element 72 are arranged in this way and moved into the recess 30, the cam element 72 resiliently expands within the attachment element 18 prior to snapping into the recess 30.

The attachment element 18 and the cam element 72 may be attached to the intermediate member 16 by first arranging the cam element 72 inside the attachment element 18, and then attaching both the attachment element 18 and the cam element 72 together to the intermediate member 16, e.g. such that cam hooks 78*b*, 78*c* on a respective cam arm 76*b*, 76*c* snap onto respective steps (not shown) of the recess 30 in the intermediate member 16.

When the cam hooks 78*b*, 78*c* of the cam element 72 snap onto steps (not shown) in the recess 30 of the intermediate member 16, the cam element 72 at the same time pulls the attachment element 18 and sell-centers the attachment element 18 with respect to the intermediate member 16. The cam element 72 thereby constitutes a helping piece for the attachment of the attachment element 18 to the intermediate member 16. The recess 30, the cam element 72 and the attachment element 18 may be configured such that there is little or no deformation of the attachment element 18 during the attachment. In this example, the attachment element 18 is thus attached to the intermediate member 16 via the cam element 72.

FIG. 1 further denotes an inner back surface 80 on the rear section 68 of the attachment element 18 and an outer back surface 82 on a rear section of the cam element 72. In this example, each of the inner back surface 80 and the outer back surface 82 are planar and parallel surfaces. The hub 10 in FIG. 1 further comprises an inner coupling element 84 and an outer coupling element 86. In this example, each of the inner coupling element 84 and an outer coupling element 86 is constituted by a spring clip.

Figure 2:
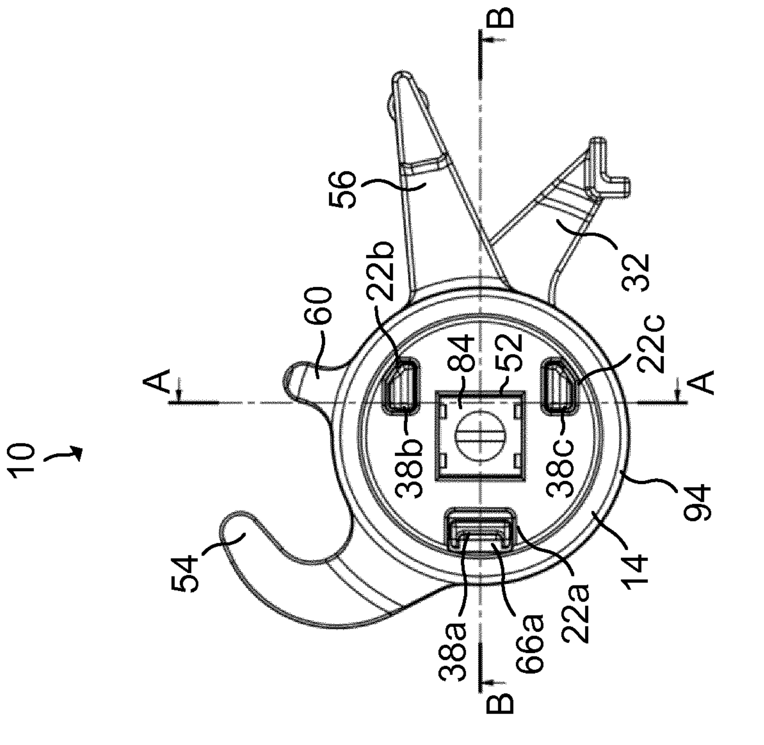
FIG. 2: schematically represents a side view of the hub.

FIG. 2 schematically represents a side view of the hub 10. The view in FIG. 2 is from the exterior inner side of the hub 10. As can be gathered from FIG. 2, the outer member 12 and the inner member 14 are rotationally aligned.

Figure 3:
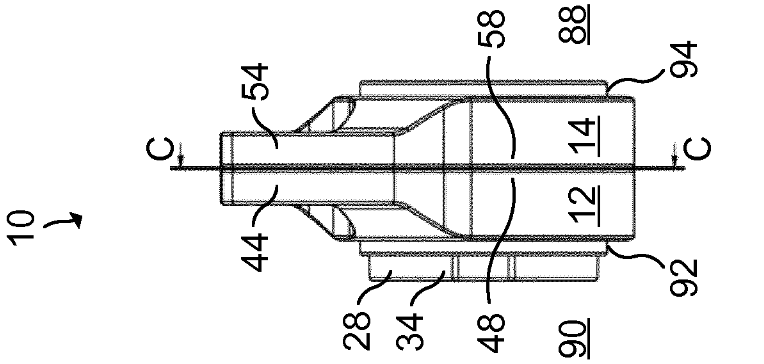
FIG. 3: schematically represents a rear view of the hub.

FIG. 3 schematically represents a rear view of the hub 10. As can be seen, the locking member 28 is here inserted into the outer member 12 and thereby rotationally locks the outer member 12 to the intermediate member 16.

In FIG. 3, the exterior inner side 88 of the hub 10 and the exterior outer side 90 of the hub 10 can be seen and are denoted. From FIG. 3, it can be gathered that the intermediate member 16 is sandwiched between the outer member 12 and the inner member 14. As shown in FIG. 3, the intermediate member 16 is covered by the outer collar 48 and the inner collar 58.

FIG. 3 further shows that the outer member 12 comprises an annular outer groove 92 facing towards the exterior outer side 90 and that the inner member 14 comprises an annular inner groove 94 facing towards the exterior inner side 88. The outer groove 92 and the inner groove 94 are used for seating the outer member 12 and the inner member 14, respectively, in a lock casing opening of the lock device. As can be gathered from FIG. 3, the base 34 of the locking member 28 will protrude from the lock casing and can be grabbed by a user.

Figure 4:
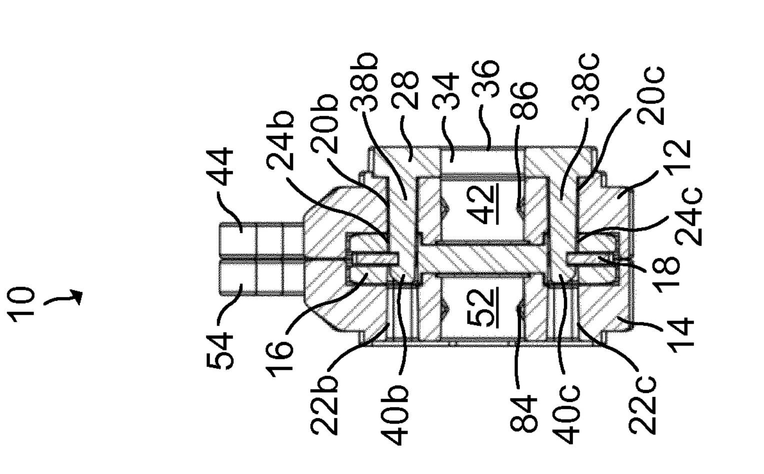
FIG. 4: schematically represents a cross-sectional view of section A-A of the hub in FIG. 2.

FIG. 4 schematically represents a cross-sectional view of section A-A of the hub 10 in FIG. 2. FIG. 4 shows the engagement between the two of the locking arms 38*b*, 38*b* and the attachment element 18. More specifically, FIG. 4 shows how the two locking hooks 40*b*, 40*c* have snapped onto the attachment element 18. As long as the attachment element 18 is in the illustrated locking position, the locking member 28 cannot be pulled out from the hub 10 due to the engagement with the attachment element 18.

FIG. 5 schematically represents a top view of the hub 10. FIG. 6 schematically represents a cross-sectional view of section B-B of the hub 10 in FIG. 2. In FIG. 6, it can be seen that the locking arm 38*a* engages the attachment element 18 between the attachment element 18 and the cam element 72 within the intermediate hole 24*a*.

FIG. 7 schematically represents a cross-sectional view of section C-C of the hub 10 in FIG. 2. In FIG. 7, the attachment element 18 is in the locking position 96. The cam followers 70*b*, 70*c* are in engagement with the respective cam profiles 74*b*, 74*c* of the cam element 72 and the attachment element 18 grasps around the cam profiles 74*b*, 74*c*.

In FIG. 7, the steps 98*b*, 98*c* of the intermediate member 16 can be seen. These steps 98*b*, 98*c* are engaged by the cam hooks 78*b*, 78*c* when snapping the cam element 72 into the recess 30.

FIG. 7 further shows that an opening 100 is defined between the inner back surface 80 of the attachment element 18 and the outer back surface 82 of the cam element 72. The opening 100 is aligned with the intermediate hole 24*a* of the intermediate member 16. Moreover, the opening 100 is only partly occupied by the locking arm 38*a*.

One example of moving the attachment element 18 from the locking position 96 to the unlocking position will now be described. In the hub 10 in FIG. 7, the locking member 28 is inserted from the exterior outer side 90 into the outer member 12 and into the intermediate member 16 (see FIGS. 1 to 6). Thereby, the inner through hole 22*a* (and also the inner through holes 22*b*, 22*c*) of the inner member 14 are open from the exterior inner side 88. A flat-blade screwdriver (not shown) can be inserted through the inner through hole 22*a* and into the opening 100.

By turning the screwdriver slightly, or by pushing it in as a wedge, the blade engages the outer back surface 82 of the cam element 72 and the inner back surface 80 of the attachment element 18. When turning the screwdriver further with a slight force, the blade pushes the attachment element 18 away from the cam element 72 (to the left in FIG. 7) into the unlocking position.

Due to the cooperation between the cam followers 70*b*, 70*c* on the attachment element 18 and the cam profiles 74*b*, 74*c* on the cam element 72, frictional forces are reduced and the attachment element 18 can smoothly move between the locking position 96 and the unlocking position. This enables a reduced twisting force of a screwdriver when the blade is inserted into the opening 100.

FIG. 8 shows the hub 10 in FIG. 7 when the attachment element 18 has moved from the locking position 96 to an unlocking position 102. As the attachment element 18 moves relatively to the cam element 72 (to the left in FIG. 8), the engagement between the locking arm 38*a* and the attachment element 18 is released. At the same time, the engagements between the cam followers 70*b*, 70*c* and the respective cam profiles 74*b*, 74*c* causes the attachment element 18 to expand such that the attachment arms 64*b*, 64*c* open. Thereby, also the engagements between the locking arms 38*b*, 38*c* and the attachment element 18 are released.

During the movement from the locking position 96 to the unlocking position 102, the attachment element 18 of this example partly slides and partly opens. Thereby, the degree of opening of the attachment element 18 can be reduced. This improves reliability of the design since the attachment element 18 is less prone to wear out due to repeated movements between the locking position 96 and the unlocking position 102. The resiliency of the attachment element 18 can thereby be maintained over time.

When the engagement between the locking member 28 and the attachment element 18 is released as shown in FIG. 8, the locking member 28 can be withdrawn out from the intermediate member 16 and the outer member 12, for example by manually grabbing the base 34 of the locking member 28 and pulling the locking member 28 out from the hub 10. The locking member 28 can then be inserted from the exterior inner side 88 of the hub 10 into the inner member 14 and the intermediate member 16. Thereby, the configuration of the hub 10 has changed from locking the outside to locking the inside.

Figure 9:
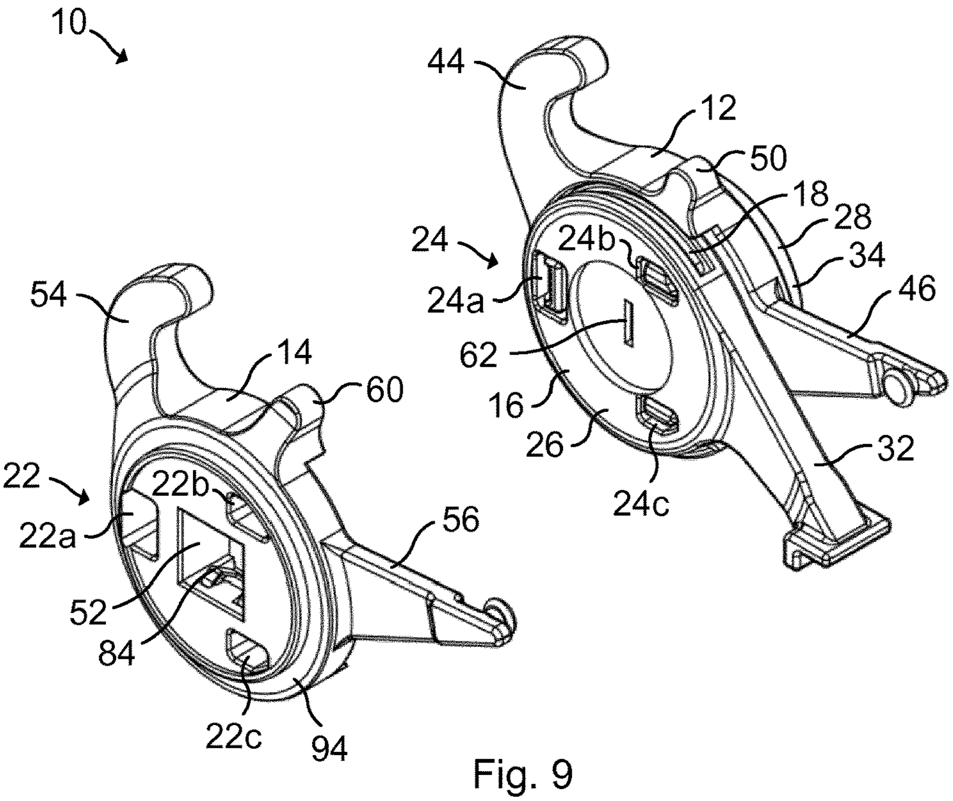
FIG. 9: schematically represents a perspective view of the hub.

FIG. 9 schematically represents a perspective view of the hub 10. The locking member 28 rotationally locks the outer member 12 to the intermediate member 16 according to FIGS. 1 to 8. Thereby, the outside of a lock device can be locked.

Figure 10:
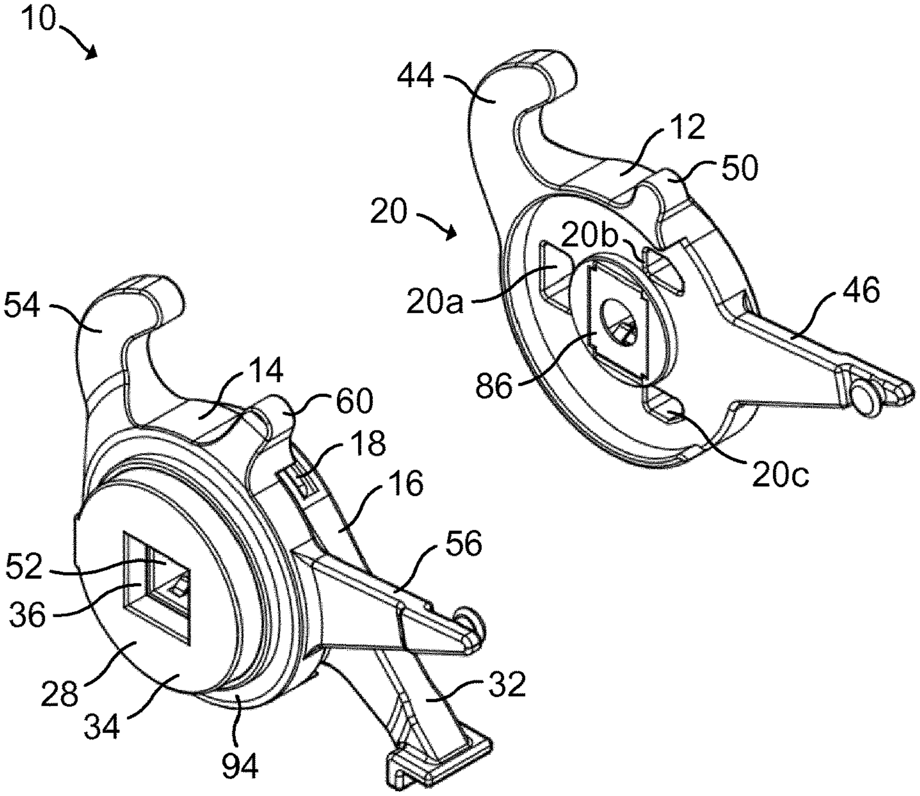
FIG. 10: schematically represents a perspective view of the hub when reconfigured.

FIG. 10 schematically represents a perspective view of the hub 10 after reconfiguration. The locking member 28 now rotationally locks the inner member 14 to the intermediate member 16. Thereby, the inside of a lock device can be locked.

By simply inserting the locking member 28 from either the outside as in FIG. 9, or from the inside as in FIG. 10, either the outside or the inside of a door can be locked. The side of the door that is locked is determined by which side the locking member 28 is inserted from, e.g. during lock installation. The hub 10 as described herein is thus simple to reconfigure and enables a simple installation of the hub 10 in a lock device.

Figure 11:
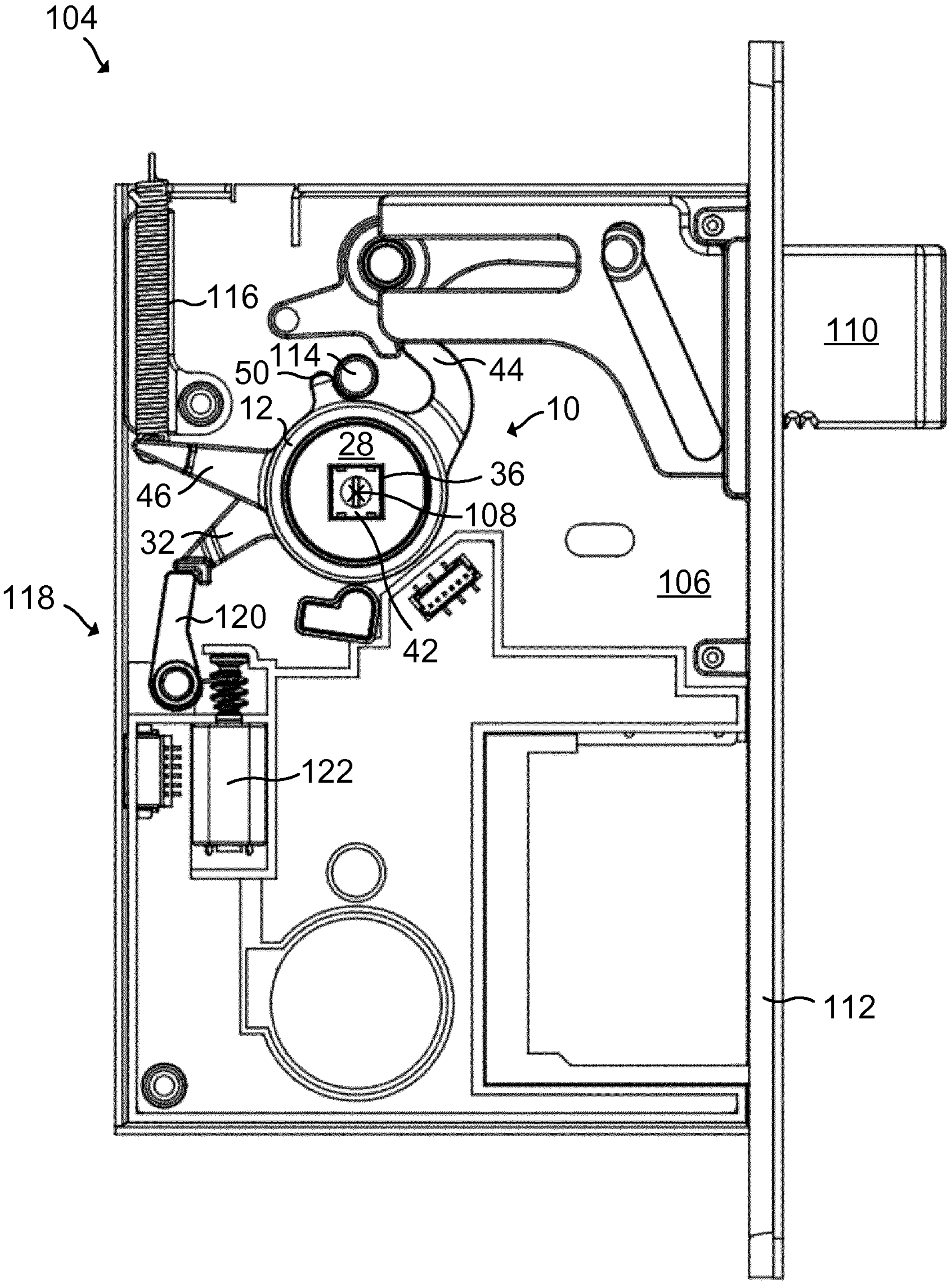
FIG. 11: schematically represents an interior side view of a lock device comprising the hub seen from an exterior outer side.

FIG. 11 schematically represents an interior side view of a lock device 104 with its outer part of a lock casing 106 removed and seen from an exterior outer side 90. The hub 10 is installed in the lock device 104. The installation of the hub 10 inside the lock device 104 does not require any addition of splints or clips. The hub 10 can be installed in the lock device 104 prior to deciding which side should be open, and which side should locked (and selectively unlocked). The lock device 104 comprises the hub 10, which is configured according to FIGS. 1 to 9. Thus, in this example, the outside of the lock device 104 is locked. The locking member 28 is readily accessible from the exterior of the lock device 104, e.g. by removing rosette or escutcheon.

In FIG. 11, the hub axis 108 is shown. The lock device 104 in FIG. 11 comprises a deadbolt 110, here in an extended position, and a forend 112, and a stationary stop 114. The lock device 104 further comprises an outer elastic element 116, here exemplified as a tension spring. The outer elastic element 116 is connected to the outer lever arm 46. The outer member 12 is rotationally biased in the clockwise direction in FIG. 11 about the hub axis 108 by means of the outer elastic element 116 into the illustrated neutral position where the outer stop 50 abuts against the stationary stop 114. The outer member 12 is thereby held in the illustrated neutral position.

The lock device 104 further comprises a Mocking mechanism 118. The blocking mechanism 118 of this example comprises a blocking lever 120, and an actuator 122 for moving the blocking lever 120 between the illustrated blocking position, and an unblocking position, for example in response to an authorization signal. The actuator 122 comprises a motor for turning a worm gear engaged by a pin connected to the blocking lever 120. The power supply to the actuator 122 may be from an external power source, or from a battery provided in the lock device 104.

In the blocking position, the Mocking lever 120 blocks the intermediate blocking arm 32 of the intermediate member 16. Thereby, any rotation of the intermediate member 16, the outer member 12 rotationally locked to the intermediate member 16 by the locking member 28, and an outer door handle (not shown) connected to the outer member 12, is blocked.

Figure 12:
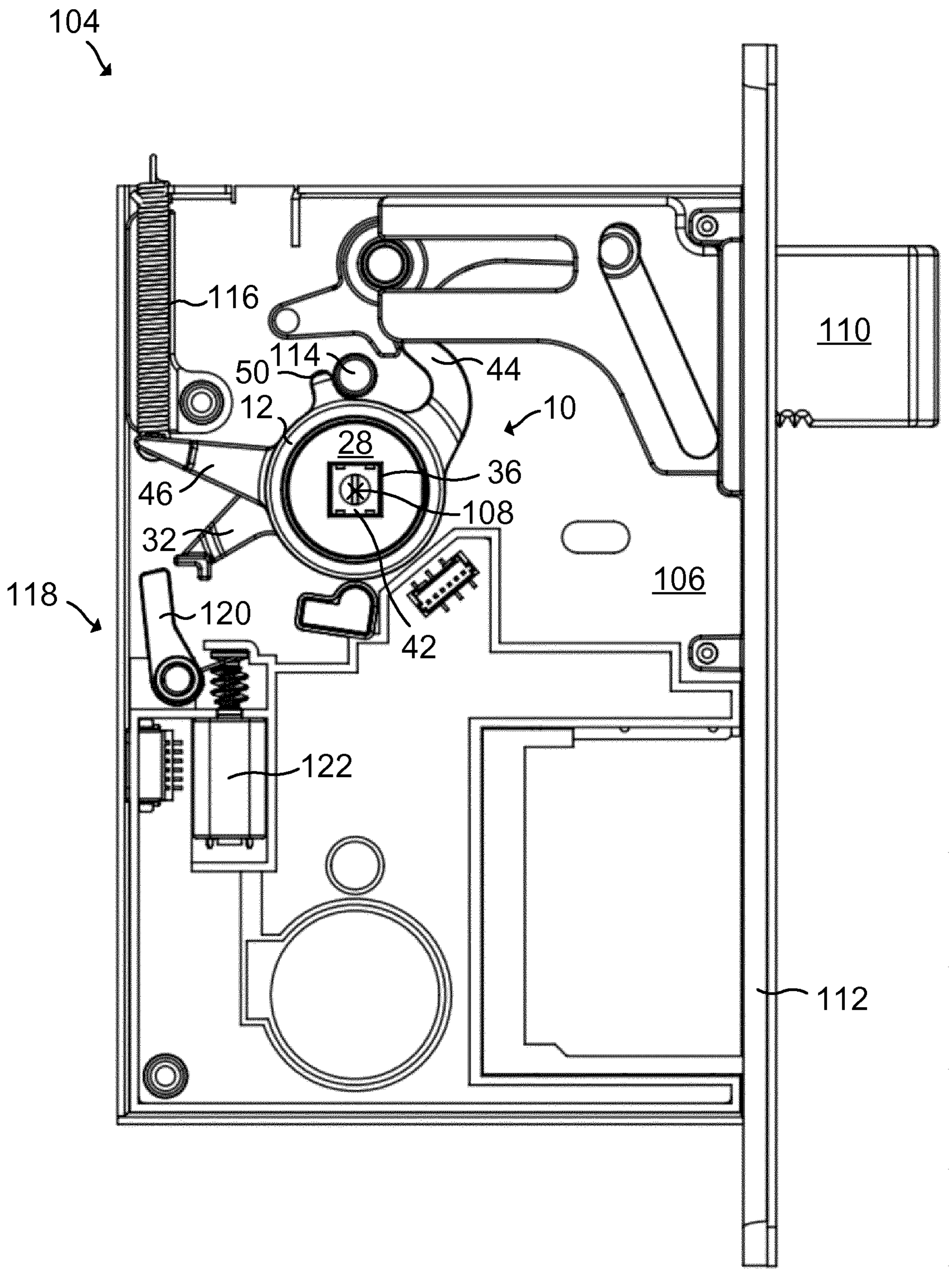
FIG. 12: schematically represents an interior side view of the lock device comprising the hub seen from an exterior outer side.
Figure 13:
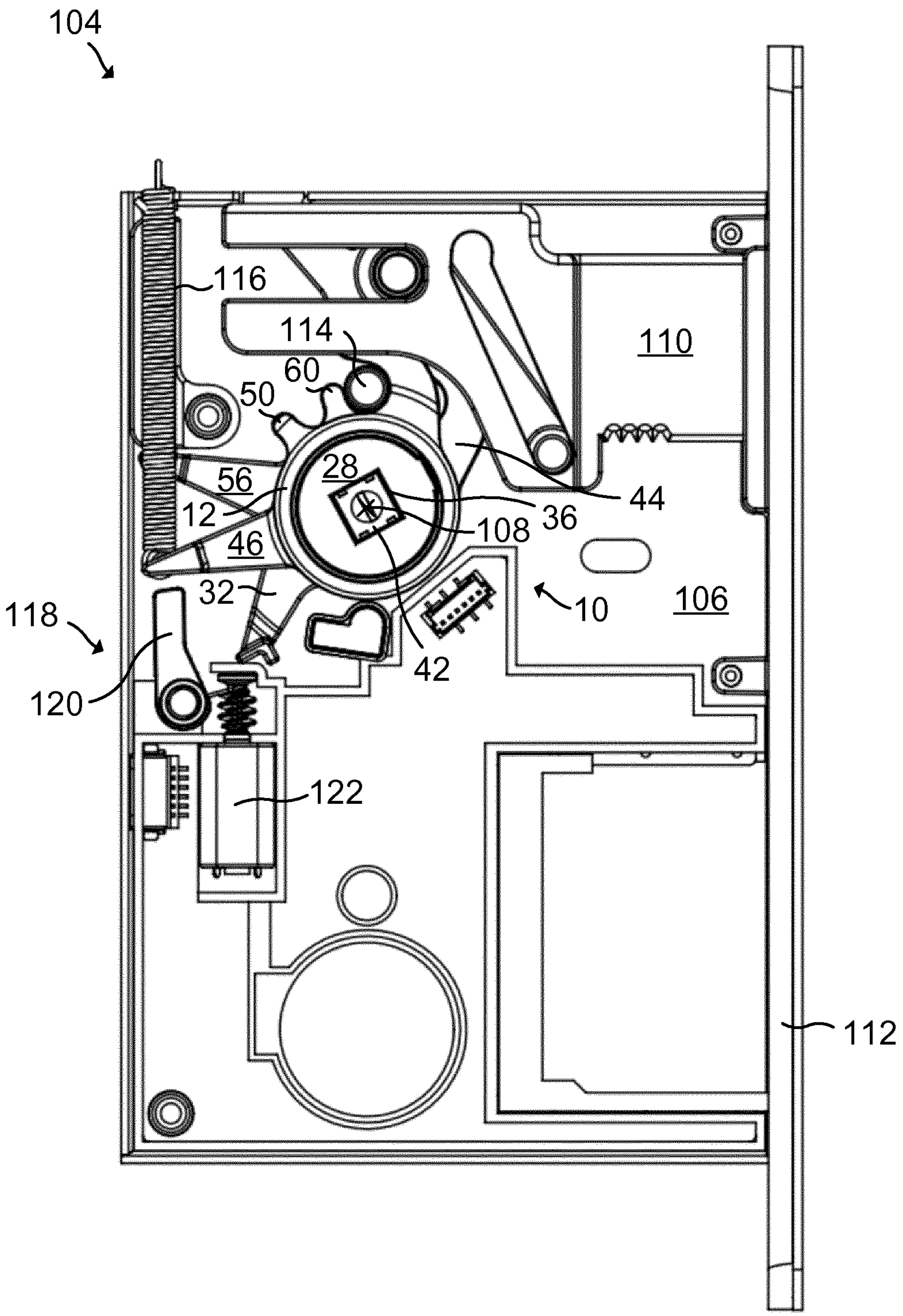
FIG. 13: schematically represents an interior side view of the lock device comprising the hub seen from an exterior outer side.

FIG. 12 schematically represents an interior side view of the lock device 104 comprising the hub 10 seen from an exterior outer side 90. In FIG. 12, the blocking lever 120 has moved to an unblocking position, for example in response to an authorization signal issued in response to a valid authorization, e.g. by presenting a card. When the Mocking lever 120 is in the unblocking position, the outer member 12 (and also the intermediate member 16) can be rotated by manually actuating the outer door handle. Rotation of the outer member 12 causes the outer bolt actuating part 44 to retract the deadbolt 110 as shown in FIG. 13.

Figure 14:
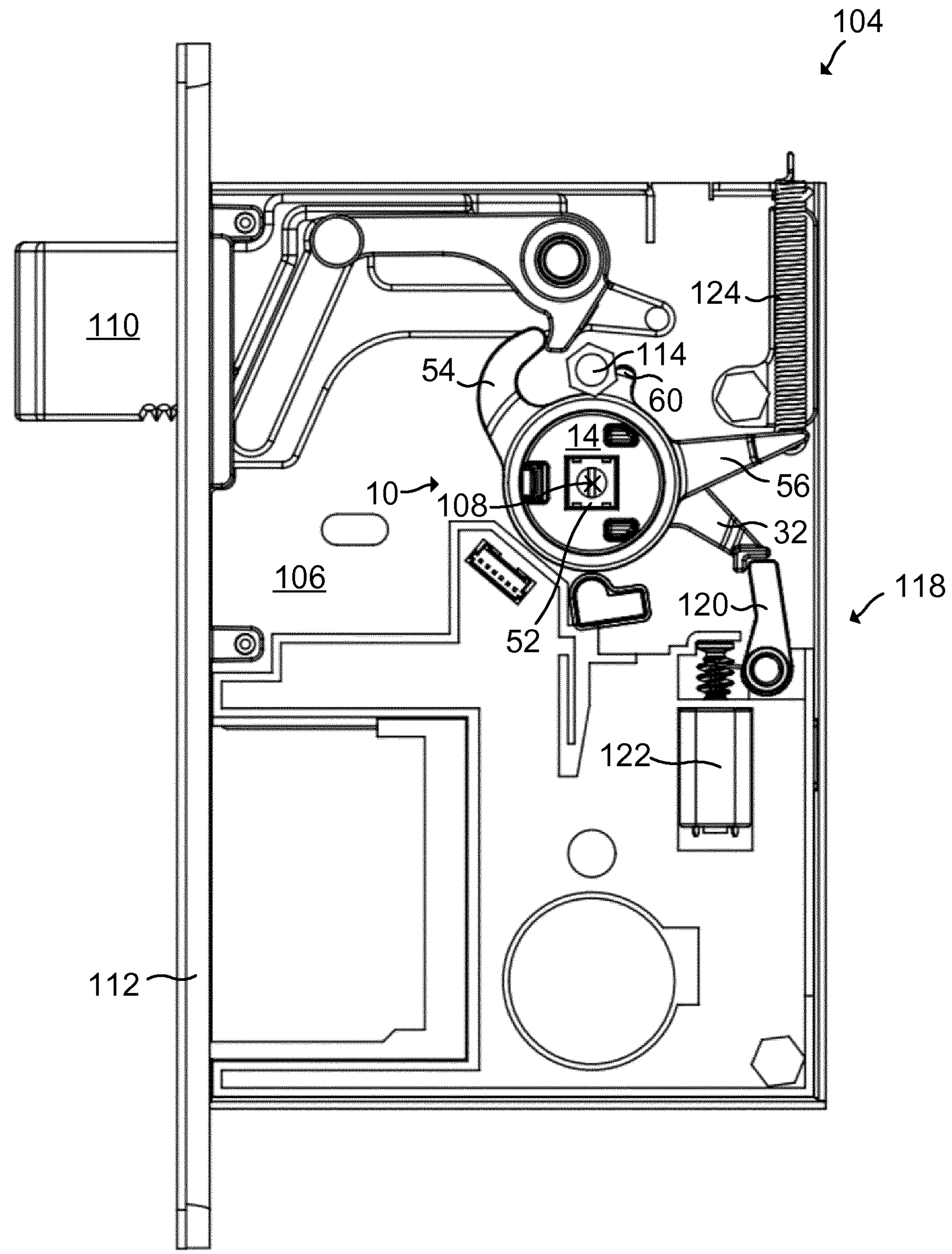
FIG. 14: schematically represents an interior side view of the lock device comprising the hub seen from an exterior inner side.

FIG. 14 schematically represents an interior side view of the lock device 104 comprising the hub 10 seen from an exterior inner side 88. This side of the lock device 104 is always open since the inner member 14 is not rotationally locked to the intermediate member 16. In FIG. 14, it can be seen that the lock device 104 also comprises an inner elastic element 124, here exemplified as a tension spring. The inner elastic element 124 is connected to the inner lever arm 56. The inner member 14 is rotationally biased in the counter-clockwise direction in FIG. 14 about the hub axis 108 by means of the inner elastic element 124 into the illustrated neutral position where the inner stop 60 abuts against the stationary stop 114. The inner member 14 is thereby held in the illustrated neutral position.

Figure 15:
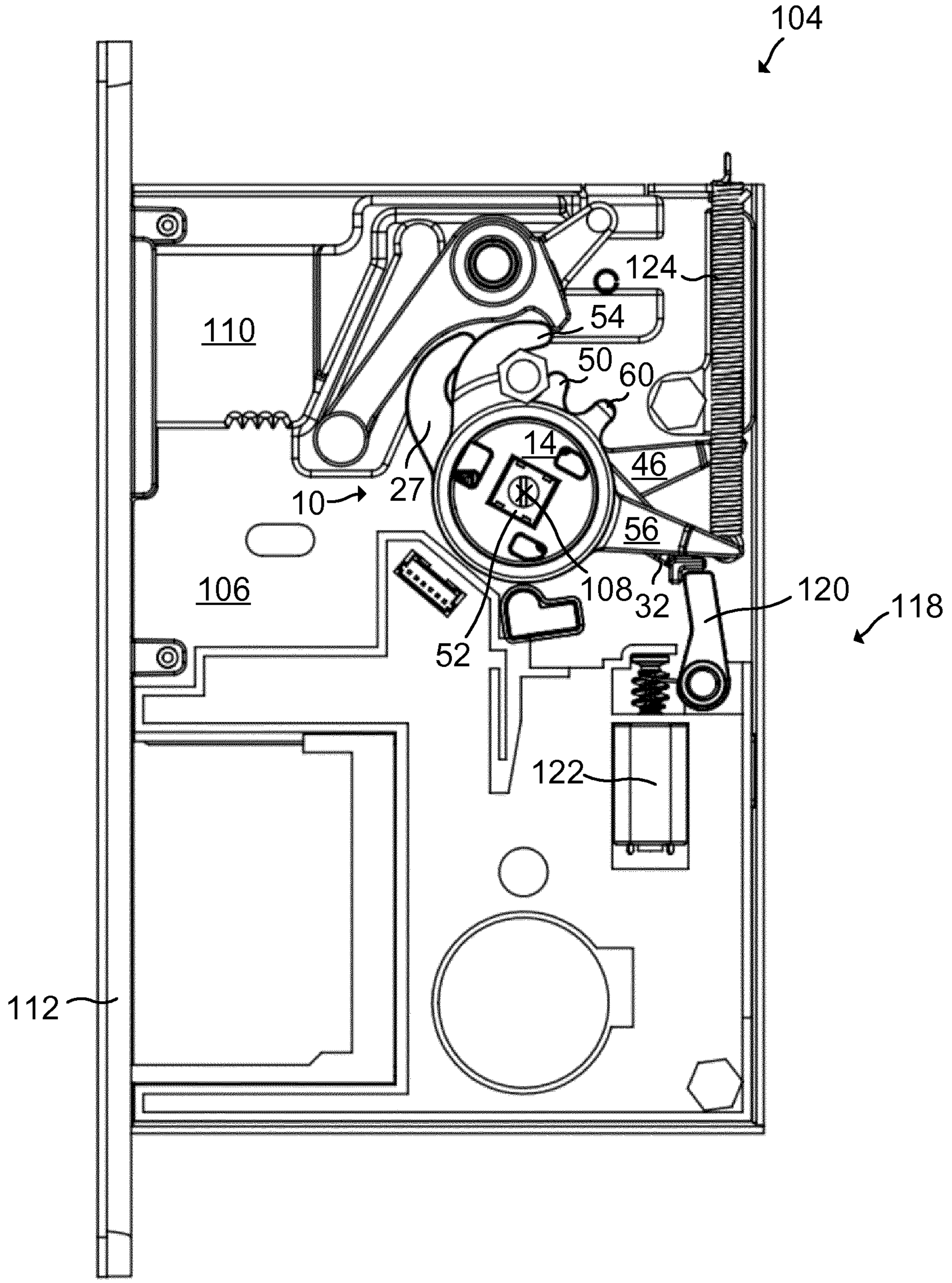
FIG. 15: schematically represents an interior side view of the lock device comprising the hub seen from an exterior inner side.

FIG. 15 schematically represents an interior side view of the lock device 104 comprising the hub 10 seen from an exterior inner side 88. Since the inner member 14 is not rotationally locked to the intermediate member 16, any rotation of an inner door handle (not shown) connected to the inner member 14 will always lead to a rotation of the inner member 14 and a consequential retraction of the deadbolt 110, regardless of the state of the Mocking mechanism 118. The inner member 14 may thus be said to bypass the intermediate member 16.

While the present disclosure has been described with reference to exemplary embodiments, it will be appreciated that the present invention is not limited to what has been described above. For example, it will be appreciated that the dimensions of the parts may be varied as needed.

What is claimed is:

1. A hub for a lock device, the hub comprising:

an outer member for rotation about a hub axis, the outer member comprising an outer opening structure;

an inner member for rotation about the hub axis, the inner member comprising an inner opening structure;

an intermediate member for rotation about the hub axis, the intermediate member comprising an intermediate opening structure, and being configured to be arranged between the outer member and the inner member;

an attachment element configured to be attached to the intermediate member, the attachment element being movable between a locking position and an unlocking position while attached to the intermediate member; and a locking member configured to be inserted into the outer opening structure and the intermediate opening structure from an exterior outer side of the hub to engage the attachment element in the locking position, and rotationally lock the outer member and the intermediate member for common rotation about the hub axis, or into the inner opening structure and the intermediate opening structure from an exterior inner side of the hub to engage the attachment element in the locking position, and rotationally lock the inner member and the intermediate member for common rotation about the hub axis;

wherein the hub is configured such that an engagement between the locking member and the attachment element is released by moving the attachment element from the locking position to the unlocking position.

2. The hub according to claim 1, wherein the attachment element is configured to be resiliently deformed between the locking position and the unlocking position.

3. The hub according to claim 1, wherein the attachment element is a C-clip.

4. The hub according to claim 1, wherein the locking member is configured to be attached to the attachment element by means of a snap-fit.

5. The hub according to claim 1, wherein the locking member comprises at least one locking arm configured to engage the attachment element.

6. The hub according to claim 1, further comprising a cam profile, and wherein the attachment element comprises a cam follower configured to follow the cam profile in order to move between the locking position and the unlocking position.

7. The hub according to claim 6, further comprising a cam element, wherein the cam profile is provided on the cam element.

8. The hub according to claim 7, wherein the cam element is configured to be attached to the intermediate member by means of a snap-fit.

9. The hub according to claim 7, wherein the cam element is a C-clip.

10. The hub according to claim 3, wherein the cam element is configured to be arranged within the attachment element.

11. The hub according to claim 10, wherein an opening is provided between an outer back surface of the cam element and an inner back surface of the attachment element when the cam element is arranged within the attachment element and when the attachment element adopts the locking position.

12. The hub according to claim 1, wherein the intermediate member comprises a recess for receiving the attachment element.

13. The hub according to claim 12, wherein the recess is joined with the intermediate opening structure.

14. The hub according to claim 1, wherein the intermediate member comprises an intermediate blocking arm for being selectively blocked by a blocking mechanism of the lock device in order to block rotation of the intermediate member.

15. A lock device comprising a hub according to claim 1.

* * * * *